United States Patent [19]

Martin et al.

[11] 4,355,570

[45] Oct. 26, 1982

[54] BARBECUE OVEN

[75] Inventors: Edward W. Martin; Kenneth R. Meyers; Fred E. Tucker, III, all of Dallas, Tex.

[73] Assignee: Fred B. Bearden, Jr., Richardson, Tex.

[21] Appl. No.: 175,578

[22] Filed: Aug. 5, 1980

Related U.S. Application Data

[63] Continuation-in-part of Ser. No. 892,398, Mar. 31, 1978, Pat. No. 4,307,659.

[51] Int. Cl.$^3$ .............................................. A47J 27/00
[52] U.S. Cl. ........................................ 99/446; 99/482; 99/400; 99/467; 219/393
[58] Field of Search ................ 99/375, 444, 447, 467, 99/469, 473, 482, 446, 425, 483, 339, 400, 407; 219/393, 396, 399, 400, 406, 407; 312/236; 126/19 M, 19 R, 190, 25 R

[56] References Cited

U.S. PATENT DOCUMENTS

| | | | |
|---|---|---|---|
| 706,502 | 8/1902 | Van Wie | 99/400 X |
| 847,117 | 3/1907 | Salmon . | |
| 1,302,682 | 5/1919 | Legg | 99/480 |
| 1,579,222 | 4/1926 | McBride . | |
| 1,612,065 | 12/1926 | Serrell | 126/19 R |
| 1,961,391 | 6/1934 | Reedy et al. | 126/339 |
| 2,577,870 | 12/1951 | Aston | 219/19 |
| 2,626,559 | 1/1953 | Rau | 219/35 |
| 2,789,877 | 4/1957 | Pfundt | 99/482 X |
| 2,842,043 | 7/1958 | Reuland | 99/259 |
| 2,846,937 | 8/1958 | Jones | 99/259 |
| 2,905,077 | 9/1959 | Del Francia | 99/446 |
| 2,912,559 | 11/1959 | Kirschke | 99/259 |
| 3,132,231 | 5/1964 | Montgomery | 219/35 |
| 3,238,863 | 3/1966 | Beasley et al. | 99/446 |
| 3,270,660 | 9/1966 | Filipak | 99/340 |
| 3,286,080 | 11/1966 | Lewis | 219/393 |
| 3,327,616 | 6/1967 | Ozymy | 99/339 |
| 3,404,258 | 10/1968 | Winkler | 219/393 X |
| 3,439,668 | 4/1969 | Tilus | 126/190 |
| 3,447,530 | 6/1969 | Santeramo | 126/25 |
| 3,568,590 | 3/1971 | Grice | 99/446 |
| 3,583,307 | 6/1971 | Lee, Sr. | 99/259 |
| 3,586,518 | 6/1971 | Folmar | 99/259 |
| 3,699,876 | 10/1972 | Ellis | 99/259 |
| 3,841,211 | 10/1974 | Ellis | 99/482 |
| 3,889,100 | 6/1975 | Dills | 219/393 X |
| 4,130,052 | 12/1978 | Jacobson | 99/482 X |

Primary Examiner—Harvey C. Hornsby
Assistant Examiner—Joseph M. Pitko
Attorney, Agent, or Firm—Richards, Harris & Medlock

[57] ABSTRACT

A barbecue oven is provided for cooking and smoking food. The oven includes a grease control system for the door of the oven comprising an inset portion and a door grease deflector cooperating to direct grease and moisture deposited on the inner door surface during cooking to the bottom interior surface of the oven. The oven also includes an electrical heating element support and wood tray assembly. An electrical heating element is supported within the assembly and protected from contact with grease or moisture within the oven. The heating element support confines heat generated by the heating element to create an area beneath the top surface of the heating element support having a relatively elevated temperature. This elevated temperature enhances the natural convection within the oven to uniformly heat the cooking area and also causes the wood within the wood tray assembly to smoulder. Multiple apertures in the assembly aid the convection flow for efficient heat transfer to the oven. The wood tray is provided with an adjustable flare preventing cover permitting smoke and heat to escape into the cooking oven while preventing flareup of the wood during cooking operation or when the oven door is opened.

1 Claim, 19 Drawing Figures

BARBECUE OVEN

CROSS REFERENCE TO RELATED APPLICATION

This application is a continuation-in-part of copending application for United States Letters Patent Ser. No. 892,398, filed Mar. 31, 1978, now U.S. Pat. No. 4,307,659.

TECHNICAL FIELD

The present invention relates to ovens and particularly to barbecue ovens for cooking and smoking food.

BACKGROUND ART

Heretofore, a wide variety of ovens have been designed for cooking and smoking food, and particularly for barbecuing beef, pork and other meats. Such previously developed ovens are known to have included electrical and wood burning heat sources. Some of the early barbecue ovens were actually metal refrigerators which were modified to include a heat and smoke source. In these ovens, the heat and smoke source was usually located near the bottom of the oven, and the food was supported on racks in the middle and top areas of the oven.

Examples of previously developed barbecue ovens include U.S. Pat. Nos. 3,841,211 and 3,699,876, both issued to Ellis. In U.S. Pat. No. 3,699,876, a barbecue oven is disclosed having an ash pit for containing a wood fire and racks disposed above the ash pit for holding food. A pan is located above the ashpit but below the racks for catching drippings from food or for supporting charcoal when the device is utilized as an outdoor charcoal grill. The oven also includes an adjustable stack with a damper to control the circulation of smoke across the food on the grill rack.

U.S. Pat. No. 3,841,211 discloses a barbecue oven having a fuel supporting tray beneath which is positioned an electrical heating element. A rack is located above the tray for supporting food. Heat from the heating element causes the wood fuel to smoke and smolder, but not blaze. The elevation of the fuel tray above the heating element is self-regulated through bimetal support elements.

The barbecue ovens heretofore developed have been characterized by numerous problems relating to grease control and air flow within the oven. When large quantities of meat are barbecued in an oven, a substantial quantity of grease and moisture is produced. In previously developed ovens, a problem has been encountered with the grease leaking from the oven into the surrounding area. The grease also tends to accumulate on surfaces within the oven. Typically, a sensor from a thermostat controlling the oven would become insulated by a coating of grease and wood resins causing the thermostat to malfunction and overheat the oven. After grease has accumulated within conventional ovens, they are typically difficult to clean because of a poor design neglecting the cleaning problems and the grease and wood resin accumulations. Also, the accumulated material has been found to foul electrical receptacles within the oven causing poor electrical connections and, in some cases, causing rapid deterioration of the receptacle.

Air flow problems within ovens previously developed resulted from the fact that the heat source is typically located in the bottom of the oven while the food is supported in the middle and top of the oven. The food nearest the heat source generally got hotter and cooked faster than the food further away from the heat source. Air circulation within the oven was impeded by the fact that the racks of food were often positioned against the oven walls such that air could not circulate around the sides of the racks.

Another problem associated with air flow is food shrinkage during cooking operations. If air is allowed to flow relatively freely through the oven, then the temperature differential within the oven is reduced, but an excessive amount of moisture is removed from the food. This results in a loss of weight or shrinkage of the food, and the food is usually drier and less tasty.

The barbecue oven of the present invention overcomes the foregoing and other problems long since associated with grease control and air flow in a barbecue oven. In accordance with the present invention, a barbecue oven is provided having an oven body which includes a top surface, a bottom surface, two side walls, a back wall and a front opening. An oven liner defining the cooking area of the oven is disposed within the oven body in a spaced apart relationship. The oven liner includes two interior side walls, a back interior wall, a top interior surface, a bottom interior surface and a front opening. A thermally insulated door is pivotally mounted on the oven body for closing the front opening of the oven liner and the oven body.

Rack supports are removably mounted on the two interior side walls of the oven, and planar cooking racks are slidably mounted in a horizontal position on the rack supports. The racks are thus mounted within the oven in a vertically spaced apart relationship from one another. Spacer pins extend from the racks to engage the back interior wall of the oven liner and to engage tne door in a closed position. These spacer pins are operable to position the racks within the oven such that air may circulate along the back interior wall and along the door of the oven in a closed position.

Drip pan supports are disposed below the rack supports, and a drip pan is slidably supported in a horizontal position on the drip pan supports beneath the cooking racks. Grease and moisture drippings falling from the food during cooking operations are caught and contained in the drip pan.

The drip pan also includes two spacer flanges, one extending from the drip pan to engage the back interior wall and the other flange engaging the door in a closed position. The spacer flanges are operable to position the drip pan in a spaced apart relationship with the back interior wall and with the door in a closed position to allow air to circulate around the drip pan. The drip pan supports are adapted to position the drip pan in a spaced apart relationship from the two interior side walls such that air also may circulate by said drip pan along the interior side walls.

The lowermost rack support includes a pair of flanges disposed horizontally along the interior side walls of the oven extending away from the interior side walls in an inward and downward direction. Each of the flanges include a back raised portion for directing drippings toward the front of the oven and includes a front raised portion for directing drippings toward the rear of the oven. The two parallel flanges are positioned within the oven to deflect drippings into the drip pan to prevent collection of grease drippings in the lower area or "firebox" of the oven.

An aperture is provided for draining grease from the drip pan, and a valve is mounted on the drip pan to control the flow of grease through the aperture. A lever handle extends from the valve and is used for opening and closing the valve. Normally, the valve is closed during cooking operations, and after the cooking is completed, the valve is opened to drain grease and moisture from the drip pan. The valve and handle are positioned such that the handle engages the door of the oven to prevent the door from closing when the valve is in an open position. In this manner, it is impossible to close the door and begin cooking operations without properly closing the valve mounted on the drip pan.

As a part of the grease control system, a door grease deflector is mounted on the lower portion of the door extending inwardly and downwardly from the door. The door grease deflector deflects grease and moisture flowing down the door of the oven causing it to drip into the bottom surface. The bottom surface includes a kick-up portion angled upwardly towards the door of the oven. The kick-up portion is disposed adjacent the door and beneath the door grease deflector, and functions to contain grease and moisture on the bottom interior surface within the oven. In this manner, grease and moisture are prevented from leaking out of the oven through a crack between the door and the oven liner.

An ash pan is disposed within the cooking area and includes a substantially horizontal surface and two leg flanges for supporting the horizontal surface in a spaced apart relationship with the bottom interior surface of the oven liner. The ash pan also includes side walls. An electrical heating element is supported on the side walls of the ash pan, and a wood tray is disposed on the heating element directly above the ash pan. The wood tray contains wood that smolders and provides smoke during the cooking operation. The wood tray includes apertures for allowing wood ashes to fall from the wood tray through the heating element and onto the horizontal surface of the ash pan. In this manner, the wood is able to smolder and smoke without an excessive accumulation of ashes in the wood tray, and the ash pan receives and contains ashes falling from the wood pan to prevent the ashes from damaging the bottom interior surface of the oven liner.

An electrical receptacle is mounted on the back interior wall of the oven liner for connection to the electrical element. A grease shroud is mounted on the back interior wall above the electricl receptacle. The grease shroud prevents grease and moisture from dripping onto the electrical receptacle. In this manner, the integrity of the electrical connection between the receptacle and the heating element is preserved, and the life expectancy of the receptacle is enhanced.

The current flowing to the electrical heating element and the temperature within the cooking area of the oven is controlled by a thermostat. The thermostat includes a temperature sensor engaging the exterior surface of the back interior wall of the oven liner for generating a signal corresponding to the temperature of the oven liner. The thermostat further includes a control unit responsive to signals from the sensor to control the current flowing to the electrical heating element. By controlling the current flowing to the electrical heating element, the temperature within the oven is maintained within a predetermined range. A dial control is provided on the thermostat for allowing the operator to select the predetermined temperature range of the cooking area during cooking operations.

As part of an air control system for the oven, a heat resistant gasket is disposed along the front opening of the oven liner to engage the door. In this manner a substantially airtight seal is formed to isolate the cooking area of the oven from the outside air. A vent pipe extends through the top surfaces of the oven liner and oven body for exhausting smoke and gases from the cooking area. Since the vent pipe is the only substantial communication between the cooking area and the exterior of the oven, there is very little air flow through the oven. The restriction of airflow through the oven is essential to the reduction in food shrinkage due to moisture loss.

To insure that the door firmly engages the gasket, at least one latch support is provided pivotally mounted on the oven body adjacent the open end of the oven body and pivotable about a first axis. A latch arm is pivotally mounted on the latch support and pivots about a second axis that is displaced from and perpendicular to the first axis. A wear plate is mounted on the door for engaging the latch arm. The latch arm is slightly bent away from the door in a latched position so that the latch engages the wear plate but is spaced apart from the door. A keeper is mounted on the door adjacent the wear plate for receiving the latch to fasten the door in a closed position with the bulb of the gasket sufficiently compressed to provide a seal.

In an alternate embodiment of the present invention, a plurality of heating elements are disposed between the oven body and the oven liner engaging the exterior surface of the oven liner at positions adjacent the cooking racks. The heating elements heat the oven liner adjacent the cooking racks to provide heat within the cooking area. At least one removable panel is provided on each exterior side of the oven body proximate to the plurality of heating elements for allowing access to the heating elements. Additionally, a smoke generator including a heating element is located in the lower area of the oven with a wood pan as previously described. The smoke generator heating element is controlled by the same thermostat that controls the main heating elements.

In a third embodiment of the present invention, a modified electrical heating element support and wood tray assembly is provided. The assembly includes a heater support acting to support an electrical heating element within the oven. The support acts to protect the heating element from contact with grease or moisture within the oven. The support further acts to confine the air heated by the heating element to create a significant heat differential between the area under the heater support and the area around it. This heat differential causes rapid convection of the heated air within the oven to accomplish an even heating without a fan or blower. To assist this convection, the heater support is provided with a plurality of apertures therein. The assembly further includes a wood container mounted atop the heater support within guides attached to the heater support that permit rapid implacement of the container within the oven. The heater support further acts to confine air heated by the heating element so that wood contained within the container is heated to a temperature to cause burning of the wood. The wood container is provided with an adjustable flare suppressing cover that permits escape of smoke and heated air while it prevents flare up of the wood during the cooking procedure or upon opening the door of the oven and exposing the oven interior to the relatively enriched oxygen content of the outside atmosphere.

The third embodiment also illustrates a modification of the door. A door inset portion is provided on the inside of the door extending within the interior of the oven. A seal is provided around the inner periphery of the door to seal against the perimeter of the oven. Between the inset and seal near the bottom of the door are provided door grease deflectors. Grease and moisture within the oven flows down the door inset portion or along the inner door surface between the inset and seal to the door grease deflector causing the grease and moisture to drip onto the bottom surface of the oven.

BRIEF DESCRIPTION OF THE DRAWINGS

The advantages and further aspects of the present invention will be readily appreciated by those of ordinary skill in the art as the same becomes better understood by reference to the following detailed description when considered in connection with the accompanying drawings in which.

DETAILED DESCRIPTION

Figure 1:
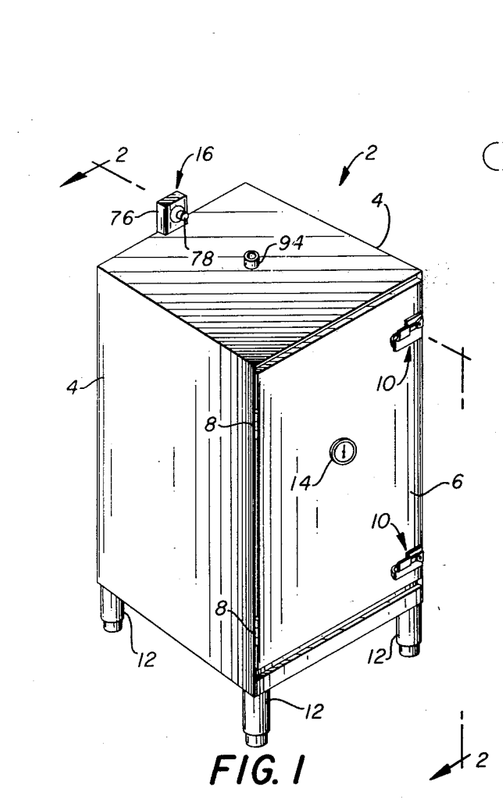
FIG. 1 is a perspective view of the barbecue oven embodying the present invention.

Referring now to the drawings, wherein like reference characters designate like or corresponding parts throughout several views, there is shown in FIG. 1 a barbecue oven 2 embodying the present invention. Barbecue oven 2 is substantially box-shaped and is constructed of steel and sheet metal in a conventional manner. The barbecue oven includes a main body 4 and an oven door 6 pivotally mounted on a pair of hinges 8. A pair of latches 10 is provided for securing door 6 in a closed position. Legs 12 support the barbecue oven 2 in a spaced apart relationship from a floor.

Also shown in FIG. 1 are a thermometer 14 and a thermostat 16. The thermometer 14 is mounted in the oven door 6 to allow the operator to conveniently monitor the temperature of the oven and to allow easy access to the thermometer 14 for cleaning. After determining the temperature within the oven by means of thermometer 14, the operator may adjust thermostat 16 to obtain a desired temperature.

Figure 2:
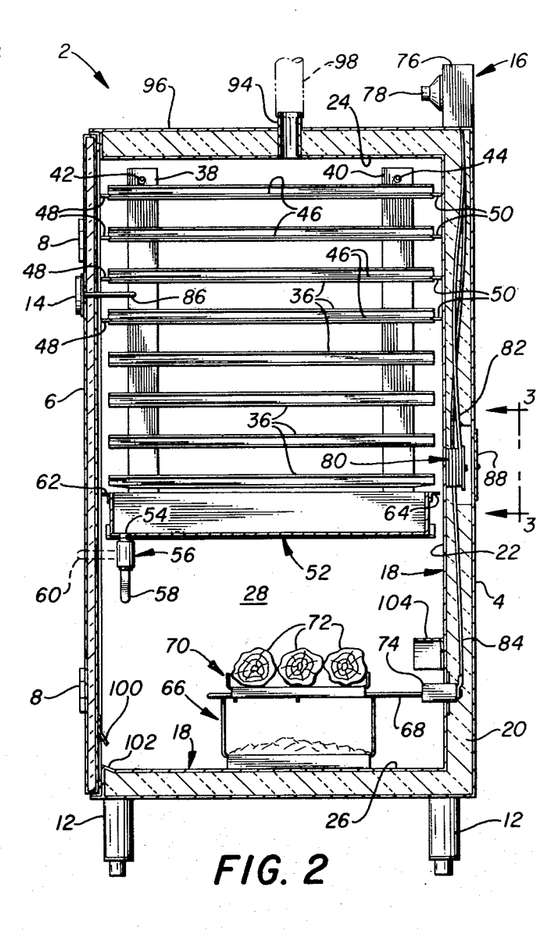
FIG. 2 is a partial cross section view of the oven taken through plane 2—2 as indicated in FIG. 1.

Referring now to FIG. 2, a cross sectional view of oven 2 is shown taken generally through plane 2—2 as indicated in FIG. 1. In this vew it is shown that an inner oven liner 18 is mounted in a spaced apart relationship within oven body 4. Oven liner 18 is constructed of sheet metal in a conventional manner, and thermal insulation 20 is provided between the liner 18 and the oven body 4 to prevent heat from escaping from the oven 2.

As shown in FIG. 2, oven liner 18 includes a back interior wall 22, a top interior surface 24, a bottom interior surface 26 and two interior side walls 28 of which one is shown in FIG. 2. A plurality of rack supports 36 are mounted on the two interior side walls 28 by means of vertical support members 38 and 40. Rack supports 36 are generally U-shaped flanges extending towards the center of the oven from the two interior side walls 28. The rack supports 36 are welded to the vertical support members 38 and 40 and the support members are removably supported on the two interior side walls by pins 42 and 44.

A plurality of cooking racks 46 are slidably supported in a horizontal position between the two interior side walls 28 by the rack supports 36. Four cooking racks 36 are shown in FIG. 2, but it is understood that a cooking rack may be slidably supported in each of the rack supports 36. Cooking racks 46 include spacer pins 48 extending from the front end of the cooking racks and spacer pins 50 extending from the back end of the cooking racks. Spacer pins 48 engage door 6 in a closed position, and spacer pins 50 engage the back interior wall 22 of the oven liner 18. In this manner, the cooking racks 46 are positioned in a spaced apart relationship between the back interior wall 22 and the oven door 6 in a closed position. Thus, air may circulate along door 6 and wall 22 during the cooking operation to insure adequate heat distribution throughout the oven.

A drip pan 52 is mounted directly below the cooking racks 46 to catch grease and moisture drippings that are produced by food while cooking on the cooking racks 46. An aperture 54 is formed in the bottom of drip pan 52, and a valve 56 is provided to control the flow of grease and moisture through the aperture as will be hereinafter described in more detail. A lever handle 58 is provided for opening and closing the valve 56.

During cooking operations it is important that valve 56 be in a closed position to prevent grease and moisture drippings from leaking out of the grease pan. For this reason, the valve 56 and the lever handle 58 are positioned to prevent an operator from inadvertently cooking while valve 56 is open. To close the valve 56, the lever handle 58 must be placed in a downward vertical position. In this position, there is adequate clearance between lever handle 58 and the door 6 to allow the door to be closed. However, to open valve 56 it is necessary to rotate the lever handle 58 into a horizontal position as indicated by phantom lines 60 shown extending through door 6. Since the lever handle 58 cannot extend through door 6, it is impossible to open valve 56 when door 6 is closed, and it is impossible to close door 6 when valve 56 is open.

Also shown in FIG. 2 are spacer flanges 62 and 64 extending from the front and back ends, respectively, of drip pan 52. Spacer flange 62 engages the door 6 in a closed position, and spacer flange 64 engages the back interior wall of oven liner 18 to positin the drip pan in a spaced apart relationship between the door and the back interior wall. In this manner, drip pan 52 is properly positioned to receive and contain grease and moisture drippings, and the air within the oven may circulate around the drip pan 52 along the door and the back interior wall.

Disposed below drip pan 52 is an assembly of an ash pan 66, an electrical heating element 68 and a wood tray 70 for providing heat and smoke during the cooking operation. The wood tray 70 is supported on the heating element 68 and usually contains a relatively small quantity of a smoke producing material such as hickory wood 72. During cooking operations, the heat from heating element 68 causes the wood 72 to smolder and smoke, thus providing heat and smoke for cooking. The ash pan 66 is removably supported on the bottom surface 26 of the oven liner 18 and is disposed to support heating element 68 and to receive ashes as they drop from the wood tray 70. The removable ash pan 66 prevents the ashes from falling on and damaging the bottom interior surface 26 of the oven liner 18. The heating element 68 is electrically connected to an electrical receptacle 74 mounted on the back interior wall 22. The current flowing to the heating element is controlled by a thermostat 16 which includes a control unit 76, a dial control 78 and a coil sensor 80 connected to the control unit by tube 82. The electrical receptacle 74 is connected to the control unit 76 by conductors 84. The thermostat used in the preferred embodiment is a conventional thermostat such as a Robert Shaw thermostat model KP or model D1/D18. The electrical receptacle is also of a conventional nature such as a chromolux plug, model UPR or model ROR.

In the present invention, the sensor 80 is mounted directly against the exterior surface of the back interior wall 22 of liner 18. Thus, sensor 80 detects the temperature of oven liner 18 which is directly proportional to the air temperature within oven 2. By mounting the sensor 80 on the exterior of liner 18, the sensor is protected from environment within oven 2 during cooking operations. It is impossible for grease to build up on sensor 80 to cause inaccurate readings and thermostat malfunction. The control unit 76 of thermostat 16 is sensitive to signals generated by sensor 80 and is operable to control the flow of current through conductors 84 to the electrical receptacle 74 and the heating element 68. In this manner, the thermostat 16 controls the heating element 68 to maintain the air temperature within the oven within a predetermined range.

The operator of the oven 2 may control the air temperature within the oven by adjusting the setting of thermostat 16 using dial control 78. The operator monitors the temperature inside the oven by means of thermometer 14 that is mounted in oven door 6 and includes a sensor probe 86 that extends through the oven door and into the interior of the oven. A suitable thermometer for use in oven 2 is Rochester thermometer model number 1594-160. To adjust the temperature within the oven, the operator simply rotates dial control 78 to a different setting, either hotter or cooler, as desired. The thermostat 16 itself is conventional. However, the sensor 80 is mounted on the exterior surface of oven liner 18 to sense the temperature of oven liner 18 which is an indirect measurement of the air temperature within oven 2.

Figure 3:
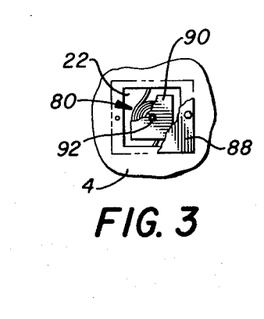
FIG. 3 is a view taken along line 3—3 showing the coiled thermostat sensor.

Referring now to FIG. 3, a detailed view of the sensor 80 is shown taken through line 3—3. A cover plate 88 mounted on oven body 4 in FIG. 2, is shown broken away in FIG. 3 to reveal the sensor 80, a coiled tube containing a temperature sensitive fluid that responds to the temperature of the oven liner 18. The sensor 80 is clamped against the back interior wall 22 of the oven liner 18 by a sheet metal plate 90 fastened to wall 2 by a bolt and nut assembly 92. In this manner, sensor 80 is maintained in an effective thermal contact with wall 22 to accurately sense the temperature of wall 22 directly, and indirectly sense air temperature within oven 2.

Referring again to FIG. 2, there is shown at the top of the oven a vent pipe 94 extending through the top interior surface 24 of liner 18 and a top exterior surface 96 of body 6 such that vent pipe 94 is the only significant air passage between the cooking area defined by oven liner 18 and the air outside oven 2 when door 6 is in a closed position. Vent pipe 94 extends a short distance above exterior surface 96, and may be connected to an external air handling system by means of an appropriate duct system such as represented by exhaust tube 98 shown in phantom lines connected to the vent pipe. Smoke and cooking fumes may be exhausted from the oven 2 through vent pipe 94.

The present invention also includes several features for controlling the flow of grease and moisture within oven liner 18. A door grease deflector 100 is mounted on the lower portion of door 6. As grease and moisture flow down the interior of door 6, they are deflected away from the door along deflector 100 in an inward and downward direction with respect to oven 2. The door grease deflector 100 causes the grease and moiture to drip onto the bottom interior surface 26. A kick-up portion 102 in surface 26 is provided to insure that the grease and moisture dripping from deflector 100 is contained within oven 2 on surface 26. The kick-up portion 102 is disposed adjacent door 6 directly under the door grease deflector 100 and is inclined upwardly toward door 6. In this manner, grease and moisture flowing down the door are prevented from escaping the cooking area defined by oven liner 18.

Another grease control feature of the present invention is a grease shroud 104 mounted on the back interior wall 22 directly above the receptacle 74. Grease shroud 104 is in the shape of an inverted "V" extending outwardly from wall 22. Grease and moisture flowing down the back interior wall 22 of liner 18 are deflected by shroud 104 to either side of receptacle 74 and prevented from contaminating the receptacle. In this manner, the integrity of the electrical connection between receptacle 74 and heating element 68 is preserved. Also, the life expectancy of receptacle 74 is enhanced by the fact that it is not exposed to excessive grease and moisture.

Figure 4:
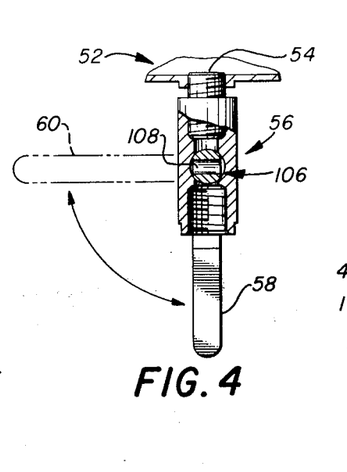
FIG. 4 is a detail of a valve mounted on the drip pan of the oven.

Referring now to FIG. 4, a detail of valve 56, another part of the grease control system, is shown. As previously described, valve 56 is mounted on drip pan 52 on aperture 54. The lever handle 58 is shown in the vertical closed position, and the horizontal open position of lever handle 58 is represented by phantom lines 60. A spherical ball member 106 is disposed within valve 56 to block or pass liquids through valve 56 depending on the position of lever handle 58. Ball member 106 includes a bore 108 extending through the ball member 106 such that when the lever handle 58 is in a vertical position, the bore 108 is in a horizontal position to block the flow of liquids through valve 56. When lever handle 58 is moved to the horizontal position represented by phantom lines 60, the bore is moved to a vertical position to allow liquids to pass through valve 56.

Figures 5, 6, 7, 9:
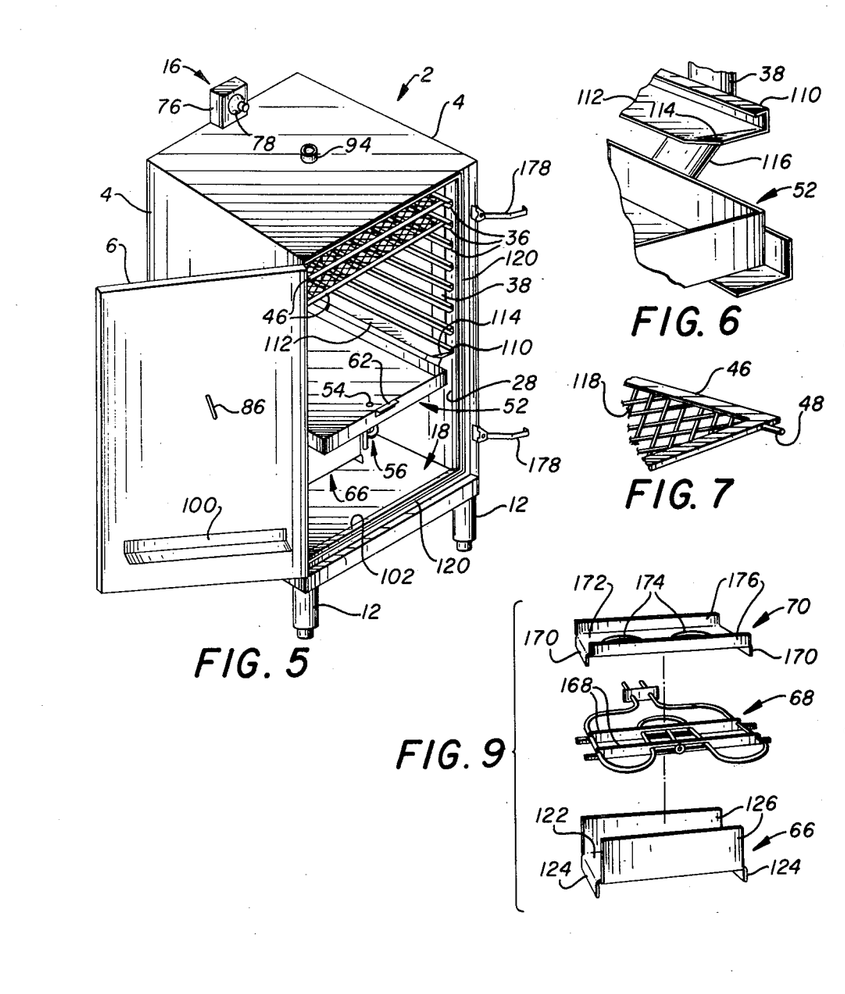
FIG. 5 is a perspective view of the barbecue oven with the oven door pivoted to an open position.
FIG. 6 is a detail showing a corner of the drip pan, a portion of the drip pan support, and the lowermost rack support.
FIG. 7 is a detail of a corner of a cooking rack showing a spacer pin.
FIG. 9 is an exploded view of the assembly of an ash pan, an electrical heating element and a wood tray.

Referring now to FIG. 5, a perspective view of the barbecue oven 2 is shown with door 6 in an open position. In this view it is apparent that both the sensor probe 86 and the door grease deflector 100 are easily accessible when door 6 is in an open position. Thus, when the door 6 is open, these two elements may be easily cleaned, replaced or repaired. The ease with which probe 86 may be cleaned is an important aspect of the present invention. A grease buildup on probe 86 would tend to insulate the probe and cause inaccurate temperature indications. By mounting the sensor probe 86 in the door, grease buildup on the probe is easily removed, and the accuracy of thermometer 14 is maintained.

Also, clearly depicted in FIG. 5 is spacer flange 62 extending outwardly from drip pan 52. Spacer flange 63 is dimensioned to be used in moving drip pan 52, and yet small enough to allow air to flow around the spacer flange within oven 2 when door 6 is closed.

The lowermost rack support 110 is mounted directly above drip pan 52 and includes an extended lower flange 112 that functions as a drip reflector to direct grease and moisture drippings into drip pan 52. As best shown in FIG. 6, flange 112 includes a raised corner 114 for directing grease and moisture drippings towards the rear of the oven along flange 112. A similar raised corner is provided on the opposite end of flange 112 adjacent the back interior wall 22 for directing grease and moisture along flange 112 towards the front of oven 2. This grease and moisture will then drip from flange 112 into drip pan 52. Also shown in FIG. 6 is one of the support arms 116 on which drip pan 52 is mounted. Support arm 116 extends downwardly and inwardly from the side interior walls 28 of liner 18. In this manner, drip pan 52 is supported in a spaced apart relationship between the side interior walls 28 such that air may circulate around drip pan 52 along the side interior walls. The spacing between drip pan 52 and walls 28 is best shown in FIG. 8.

Referring now to FIG. 7, a detail is shown of the spacer pin 48 extending from one of the cooking racks 46. Spacer pin 48 extends from rack 46 for a distance of approximately three quarters of an inch and is sufficiently strong for supporting a force to slide rack 46 along rack supports 36 when the rack is completely loaded with food. It is apparent that spacer pin 48 is dimensioned to allow air to circulate around cooking rack 46 as previously described with regard to FIG. 2. Spacer pins 50 are substantially identical to spacer pins 48 and are located on the opposite side of rack 46 as depicted in FIG. 2. The interior portion of rack 46 consists of a grate 118 suitable for use as a cooking rack in a stove.

Figure 8:
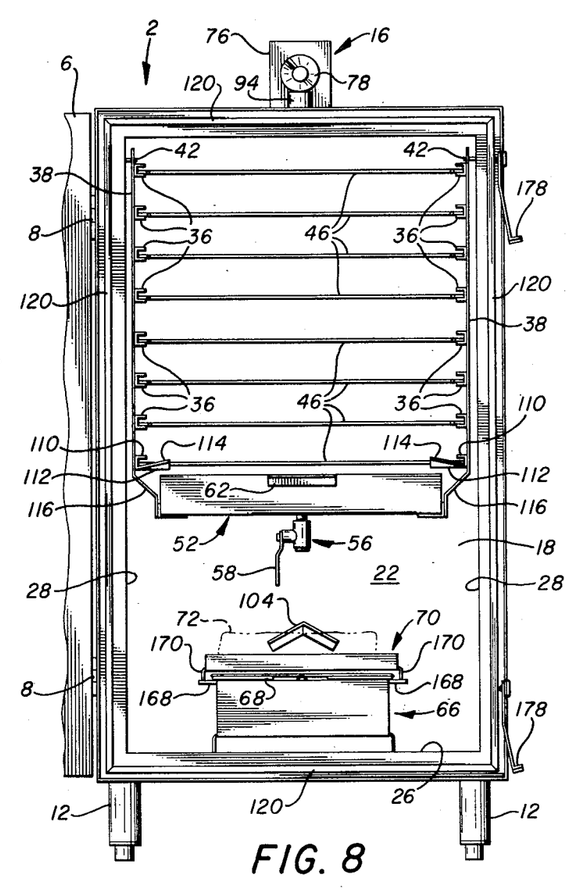
FIG. 8 is a front view of the barbecue oven with the door open and broken away.

Referring now to FIG. 8, a front view of oven 2 is shown with door 6 open and broken away. This view best shows the cross section of rack supports 36 and discloses that cooking racks 46 are mounted in a horizontal position supported between the two interior side walls 28 by rack supports 36 on the opposing side walls. The drip pan 52 is mounted below racks 46, and is smaller in width than the racks. However, flanges 112 extending from the lowermost rack support 110 insure that grease and moisture dripping from the cooking racks 46 will be directed into drip pan 52. A substantially rectangular gasket 120 is mounted on oven 2 about the front opening of liner 18 and is preferably constructed of a heat resistant material such as heat resistant silicon rubber. The door 6 firmly engages gasket 120 when the door is in a closed position with the bulb of the gasket sufficiently compressed to form a substantially airtight seal. In this manner, the cooking area defined by liner 18 is substantially isolated from the air outside the oven.

Referring now to FIG. 9, there is shown an exploded perspective view of the assembly of the ash pan 66, the heating element 68 and the wood tray 70. Ash pan 66 includes a substantially horizontal planar member 122 for receiving and containing ashes. Leg flanges 124 extend from either end of planar member 122 to support it in a spaced apart relationship on the bottom interior surface 26 of oven liner 18 as best shown in FIG. 8. Ash pan walls 126 extend upwardly from the sides of planar member 122 for engaging and supporting the electrical heating element 68. The heating element 68 is a conventional element such as General Electric Model No. 46C351Y or Chromolux Model RPT, and includes braces 168 extending between parallel portions of the heating element.

The wood tray 70 rests on top of heating element 68 and includes downwardly extending retainer flanges 170 that engage braces 168 of heating element 68 to maintain the wood tray in its proper position. The wood tray 70 has a substantially planar tray bottom 172 that includes two relatively large apertures 174. Wood tray side walls 176 extend upwardly from the sides of the wood tray bottom 172 and function to retain smoke producing material such as wood within the wood tray 70.

When wood is placed in tray 70, the heat from heating element 68 causes the wood to smolder and smoke. As the wood smolders, ashes are formed that fall through apertures 174 through the heating element 68 and into the ash pain 66. The ashes will rest on planar member 122 and will not burn or damage other parts of the oven. It is apparent that the above described assembly is completely removable from the oven and may be easily replaced.

An important feature of the oven 2 of the present invention is that all the above described interior components within the oven except the pins 42 and 44, the grease shroud 104, the electrical receptacle 74, the door grease deflector 100 and the thermometer 14 are removable. This removability feature facilitates the job of cleaning the removable components and the interior of the oven 2.

Figure 10:
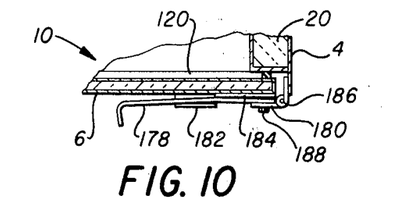
FIG. 10 is a top view of the latch mechanism.

Referring now to FIG. 10, a top view of latch 10 is shown in the latched position. The latch includes a latch arm 178 pivotally mounted on a latch support 180 which is pivotally mounted on the oven body 4. In FIG. 10, the latch arm 178 is shown positioned within a keeper 182 that is mounted on the oven door 6. A wear plate 184 is mounted between latch arm 178 and door 6. The latch arm is bent away or curved away from the door such that latch arm 178 engages the wear plate but is spaced apart from the surface of door 6. In this manner, a long lasting latch is provided for the oven 2 that is simple and inexpensive to construct, is long lasting and does not abrase the surface of door 6.

Figure 11:
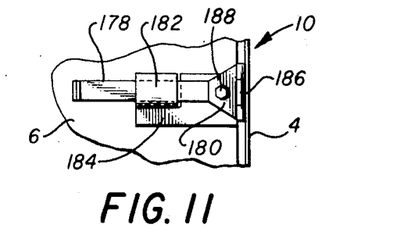
FIG. 11 is a front view of the latch mechanism.

In FIG. 11, a front view of latch 10 is shown with latch arm 178 positioned within keeper 182. Keeper 182 and wear plate 184 are constructed of a continuous sheet of metal, with keeper 182 being a flange cut and formed out of wear plate 184. By welding wear plate 184 on door 6, both the wear plate 184 and the keeper 182 are secured in their proper position on door 6.

Figure 12:
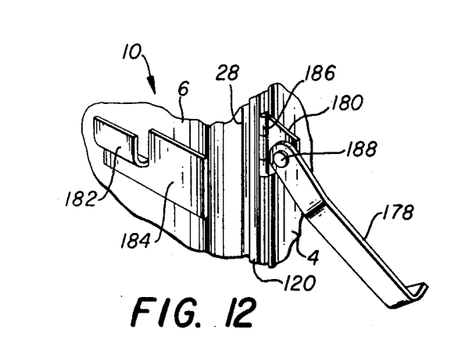
FIG. 12 is a perspective view of the latch mechanism in an unlatched position.

Referring now to FIG. 12, a perspective side view of latch 10 is shown. In this view the door 6 is shown slightly ajar in an unlatched position. Latch support 180 is pivotally mounted on the oven door 4 by means of hinge 186, and latch arm 178 is pivotally mounted on latch support 180 by means of a bolt 188. To latch the door 6, the door is first closed. Then, latch arm 178 is rotated upwardly in a vertical plane about bolt 188. Then, the latch arm 178 and latch support 180 are rotated towards the door about an axis defined by hinge 186. When latch arm 178 is directly above keeper 182, arm 178 is rotated downwardly about an axis defined by bolt 188 and is secured within keeper 182.

Figure 13:
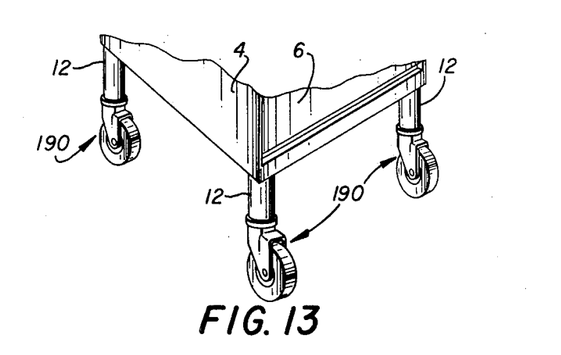
FIG. 13 is a detail of the optional castors for supporting the barbecue oven.

Referring now to FIG. 13, a detail of the lower portion of oven 2 is shown including legs 12. In this view it is apparent that legs 12 may be adapted to receive castors, such as castors 190. By mounting the oven 2 on castors 190, the movement of the oven is facilitated.

Figure 14:
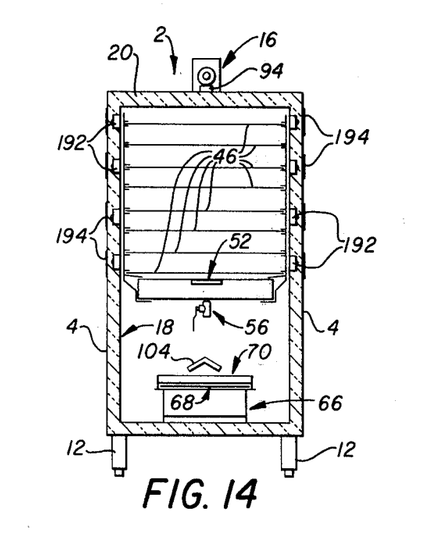
FIG. 14 is a front cross sectional view of the barbecue oven showing heating elements disposed along the sides of the oven.

Referring now to FIG. 14, a front cross sectional view of an alternate embodiment of oven 2 is shown. In this alternate embodiment, additional heating elements 192 are provided mounted on the exterior surface of the oven liner 18 between liner 18 and the oven body 4. Heating elements 192 are conventional heating devices generally known as strip heaters. The heating elements 192 are mounted engaging the exterior surface of liner 18 adjacent the cooking racks. Insulation 20 is provided such that heating elements 192 transfer heat to the oven liner 18, but the elements 192 are thermally insulated from the oven body 4. By providing the heating elements 192 adjacent the cooking racks 46, an even heat distribution is obtained between the various cooking racks. In this manner, a consistent degree of doneness is insured for food cooked within oven 2.

When the oven 2 is provided with the heating elements 192, heating element 68 may be reduced in size. However, heating element 68 may not be eliminated because it is still necessary for heating wood in wood tray 70 to provide smoke within the cooking area defined by oven line 18.

Figure 15:
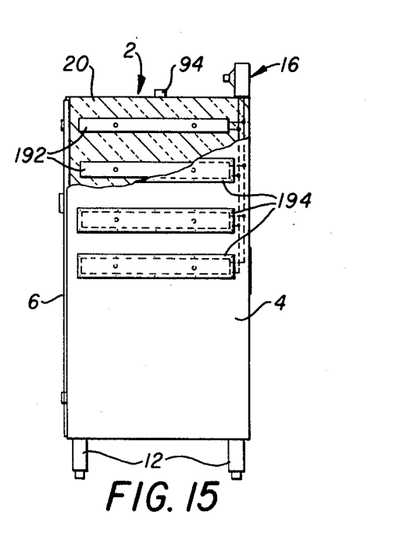
FIG. 15 is a side view of the barbecue oven with the wall partially cut away showing the side mounted heating elements and the cut-out panels covering the heating elements.

Referring now to FIG. 15, a side view of the alternate embodiment of oven 2 is shown including the heating elements 192. In this view, the oven body 4 is partially cut away to reveal the horizontal placement of heating elements 192. Through panels 194, the heating elements 192 may be repaired or replaced. Although several cutout panels 194 are shown in FIG. 15, it is to be understood that one or more panels may be provided in oven 2 for allowing adequate access to the heating elements 192.

Figures 16A, 16B, 17, 18:
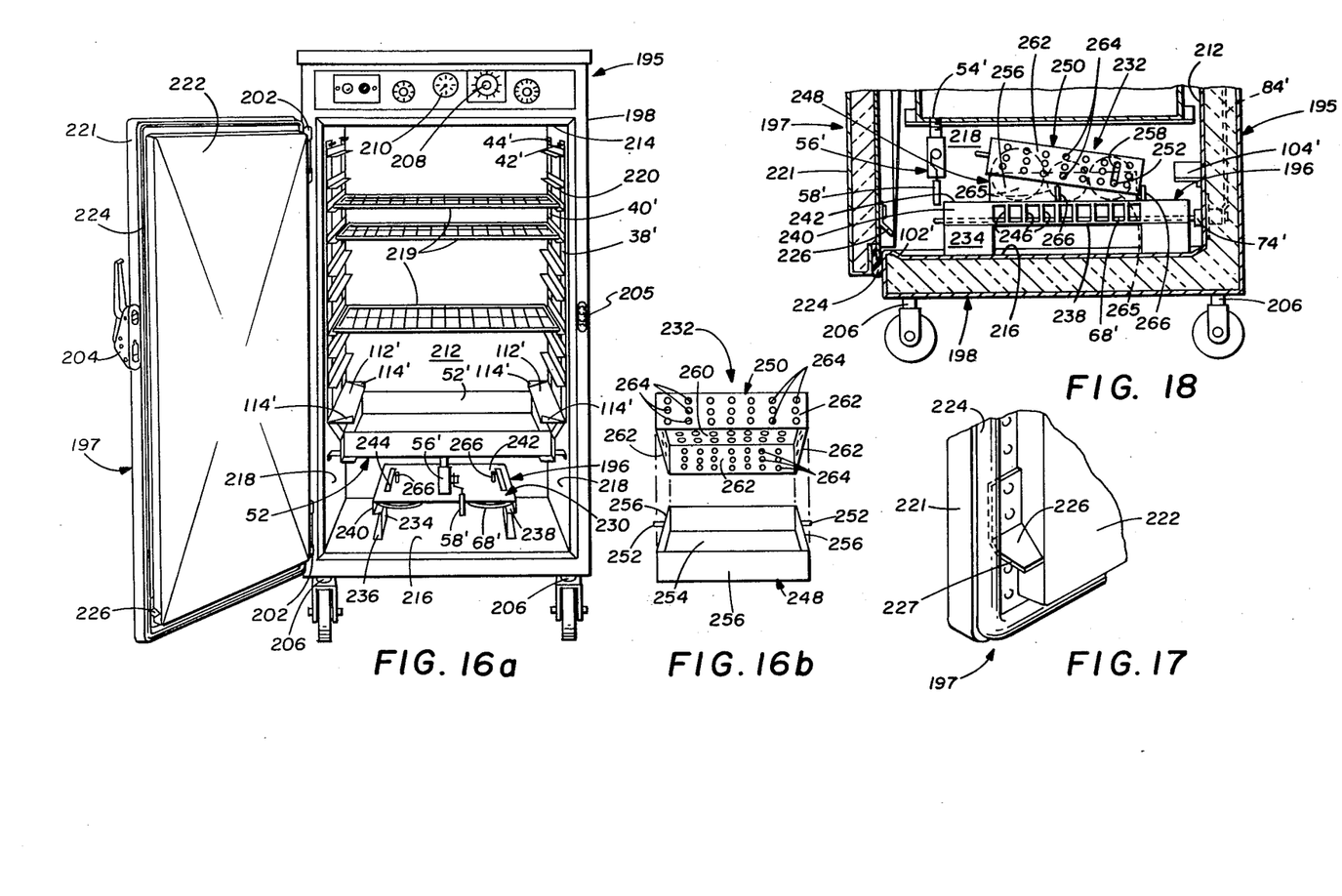
FIG. 16a is a perspective view of the third embodiment of the barbecue oven with the door open.
FIG. 16b is a detail of the wood tray of the third embodiment of the barbecue oven.
FIG. 17 is a detail of the door grease deflector of the third embodiment of the barbecue oven.
FIG. 18 is a side view of the lower portion of the barbecue oven shown in FIG. 16 with the side wall partially cut away showing the electrical heating element and wood tray assembly.

Referring now to FIGS. 16–18, a third embodiment of the barbecue oven 2 is shown as oven 195. In this embodiment, a modified electrical heating element support and wood tray assembly 196 is illustrated. Oven 195 also illustrates a modified oven door assembly 197. Numerous component parts of oven 195 are substantially identical in construction and function to component parts of the oven 2 as described hereinabove in connection with FIGS. 1–15. Such identical component parts are designated in FIGS. 16–18 by means of the same reference numerals utilized in connection with the description of oven 2, but are differentiated therefrom by means of a prime (') designation.

The oven 195 comprises a main body 198 and oven door assembly 197. The oven door 197 is secured to the main body 198 by hinges 202. The door 197 is secured in the closed position, covering the opening in the main body, by means of a door latch 204 and keeper 205. Door latch 204, keeper 205 and hinges 202 are substituted for latch 10 illustrated in FIGS. 10–12 and hinges 8 in FIG. 1. Latch 204 and hinges 202 permit the door assembly 197 to be hingably mounted on either vertical side edge of main body 198 to suit the particular application of the oven 195. The oven 195 may also be provided with legs 206, having rotatable wheels thereon or adapted to receive castors in a manner similar to that illustrated in FIG. 13 in respect to oven 2.

To simplify the monitoring and control functions of the operator of oven 195, the various instruments and controls on the oven have been moved to a single display panel at the top of the front wall of the oven 195. Thermostat 208, for adjusting the temperature within the oven, and thermometer 210, for monitoring the temperature of the oven, are located in the panel.

Oven 195 is provided with a back interior wall 212, a top interior surface 214, a bottom interior surface 216 and two interior sidewalls 218. A plurality of cooking racks 219 are slidably supported in a horizontal position between the two interior sidewalls 218 by the rack supports 220. The cooking racks 219 in oven 195 differ from racks 46 as illustrated above with reference to oven 2 in being commercial, off the shelf items and are not equipped with spacer pins 48 and 50. The rack supports 220 are welded to the vertical support members 38' and 40' and the support members are removably supported on the two interior sidewalls by pins 42' and 44'. The rack supports 220 differ from the rack supports 36 of oven 2 in being generally L shaped flanges, which permit ease of insertion of racks 219 within the interior of oven 195 and ease of cleaning.

FIG. 16a illustrates the modified oven door assembly 197 which comprises a main door section 221, a door inset 222, a door seal 224 and door grease deflectors 226. Main door section 221 is sized to cover the front opening of oven 195 and provide a point of attachment for resilient sealing means in the form of seal 224 interposed between section 221 and the outer periphery of the front opening of oven 195. The section 221 is hingably secured to the main body 198 by means of hinges 202 and is secured in the closed position by door latch 204. Door inset 222 extends from the inner side of section 221 into the interior of the oven 195. Inset 222 acts to further insulate the interior of oven 195 from the outside environment. In addition, any grease or moisture collecting on the inner surface of the inset will drop directly onto the bottom interior surface 216. The bulb of seal 224 is sufficiently compressed between section 221 and the outer periphery of the front opening of oven 195 when section 221 is in the closed position to form an airtight seal and to seal the moisture within the oven 195 during cooking. Door grease deflectors 226 are provided on both sides of door assembly 197 to insure that grease and moisture deposited on the door assembly between the inner surface of the door inset 222 and door seal 224 drip from the deflectors onto the bottom interior surface 216. The kick-up portion 102′ is disposed adjacent door assembly 197 directly under the door grease deflectors 226 and inclined upwardly toward door assembly 197. In this manner, grease and moisture are prevented from escaping the cooking area defined by the interior of oven 195. Door grease deflectors 226 are provided with a slightly beveled edge 227, as shown in FIG. 17, to permit closure of door assembly 197. The assembly 197 is preferably manufactured from stainles steel to comply with health standards within the industry. No sensor probe corresponding to probe 86 in door 6 of oven 2 is found in assembly 197. Probe 86′ has been moved to the top interior surface of oven 195 to measure the air temperature near the top of the oven and is not shown as the location and sensor is known in the art.

A drip pan 52′ is mounted directly below the cooking racks 219 to catch grease and moisture drippings that are produced by food while cooking on the cooking racks 219. An aperture 54′ is formed in the bottom of drip pan 52′, and a valve 56′ is provided to control the flow of grease and moisture through the aperture in a manner described above in relation to valve 56 as shown in FIG. 4. A lever handle 58′ is provided for opening and closing valve 56′. Flanges 112′ extend from the lower most rack support 220 with raised corners 114′ and insure that grease and moisture dripping from the cooking racks 219 will be directed into drip pan 52′.

As illustrated in FIGS. 16a, 16b and 18, oven 195 includes an electrical heating element support and wood tray assembly 196. Assembly 196 comprises heater support 230 and wood tray 232 and cooperates with heating element 68′. Wood tray 232 has been removed from its normal position atop heater support 230 in FIG. 16a and illustrated in greater detail in FIG. 16b. The heater support 230 comprises vertical spacer portions 234 extending upwardly from horizontal flange portions 236, horizontal ledge portions 238 extending horizontally outward from the top of vertical spacer portions 234, vertical sidewalls 240 extending vertically upward from the outer horizontal edge of ledges 238 and a substantially horizontal top surface 242. Top surface 242 is provided with apertures 244 and the vertical sidewalls 240 are provided with apertures 246. During a cooking operation, the heating element 68′ heats the surrounding air. The heater support 230 acts to confine the heated air below the top surface 242. This confinement serves two significant functions within the present invention. First, it creates a significant temperature differential between the area under the heater support 230 and the area surrounding it. This temperature differential causes a rapid convection of the heated air within the oven 195 to create sufficient air motion within the oven to accomplish even heating of the food within the cooking area without the need of a fan or blower. Apertures 244 and 246 and the open sides of the heater support 230 permits the heated air to escape from under the heater support 230 to the cooking area within the oven. Secondly, the confinement of heated air beneath the top surface 242 creates an area of substantially elevated temperature which elevates the temperature of top surface 242 and the wood tray 232 resting thereon by conduction so that wood contained within wood tray 232 will smoulder.

The heating element 68′ includes braces 168′ (not shown) extending between parallel portions of the heating elemennt for supporting heating element 68′ on ledge portions 238 of heater support 230. Vertical spacer portions 234 act to separate heating element 68′ a predetermined distance from bottom interior surface 216. The apertures 244 of top surface 242 are located so that grease and moisture will not drop onto the coils of the heating element 68′. Current is provided to heating element 68′ through conductors 84′ to the electrical receptacle 74′. Receptacle 74′ is protected from grease and moisture within the oven by deflector 104′.

As illustrated in FIGS. 16b and 18, wood 232 comprises a wood container 248, an adjustable flare suppressing cover 250 and flare suppressing cover support pins 252. Wood container 248 has a horizontal bottom surface 254 and vertical sidewalls 256 to form an enclosure within which the barbecue wood is placed. The adjustable flare suppressing cover 250 is secured atop wood container 248 by use of support pins 252 interacting with elongated slots 258. Elongated slots 258 permit vertical motion of the cover 250 relative to container 248 to compensate for varied sizes and thicknesses of wood. Cover 250 comprises a flat top surface 260 and sidewalls 262 and consists of a material having a plurality of small holes 264 therethrough.

Barbecue wood 265 is placed within wood container 248 as shown in FIG. 18. During cooking operations, the heat from heating element 68′ causes the wood to smolder and smoke, thus providing heat and smoke for cooking. The ashes created by the cooking operation are maintained within wood container 248. The small holes or perforations 264 in cover 250 allow escape of smoke and heated air from within the wood container 248 while preventing flareup, ignition or flaming of the wood smoldering within the wood container 248 during cooking operations or when the oven door 197 is opened, causing a sudden addition of oxygen within the interior of oven 195. Without a suppressor, wood flareup could create the hazard of a grease fire within the oven.

The wood tray 232 rests on top of support 230 and is positioned thereon by means of pins 266 welded to the top surface 242 of support 230. As shown in FIGS. 16 and 18, pins 266 are located to guide wood tray 232 into its proper position when inserting the tray from the front of the oven 195.

Although three particular embodiments of the present invention have been described in the foregoing Detailed Description, it will be understood that the invention is not limited to the embodiments disclosed, but is capable of numerous rearrangements, modifications, and substitution of parts and elements without departing from the spirit of the invention.

We claim:

1. A barbecue oven for cooking and smoking food comprising:

a main body portion defining a cooking area and having a front opening;

a door assembly hingably mounted to said main body portion for closing said front opening;

said door assembly comprising a main door section, a door inset extending inwardly into said cooking area, hinge means for hingably mounting said door assembly to said main body portion, latch means for securing said door assembly closing said front opening, seal means interposed between said main door section and the periphery of said main body portion about the front opening to form an airtight seal therebetween and door grease deflectors extending inwardly and downwardly from a lower portion of said main door section between said door inset and said seal means, said door inset and said door grease deflectors deflecting grease and moisture deposited on and flowing down the inner surface of said main door section and said door inset and causing said grease and moisture to drip onto the bottom interior surface of said main body portion;

said bottom interior surface including a kick-up portion angled upwardly adjacent the door assembly of the oven and being disposed beneath said door assembly for containing grease and moisture on the bottom interior surface within the oven;

racks supports mounted on two interior sidewalls of said oven;

a plurality of substantially planar cooking racks for supporting the food during cooking, said racks being slidably mounted within said cooking area on said rack supports in a horizontal position, said racks being mounted in vertically spaced apart horizontal planes;

a drip pan supported below said cooking racks for catching grease and moisture dropping from the food during cooking;

side grease deflectors disposed below said cooking racks and above said drip pan and extending inwardly from said oven main body portion to deflect grease and moisture droppings from the food during cooking into said drip pan;

the lowermost rack support comprising two parallel flanges disposed horizontally along the interior sidewalls of the oven and extending away from said interior sidewalls in an inward direction, each of said flanges including a back raised portion for directing grease and moisture droppings toward the front of the oven and including a front raised portion for directing grease and moisture drippings toward the rear of the oven;

an aperture disposed in said drip pan for draining grease and moisture from said drip pan;

a valve mounted on said drip pan to control the flow of grease and moisture through said aperture;

a lever handle extending from said valve for opening and closing said valve to selectively allow grease and moisture to flow through said aperture, said handle being positioned to engage the door assembly of the oven to prevent the door assembly from being closed when said valve is in an open position;

an electrical heating element disposed within said cooking area for providing heat;

an electrical receptacle connected to said electrical heating element for providing electrical current to said electrical heating element;

a grease shroud disposed above said electrical receptacle for preventing grease and moisture from dripping onto said electrical receptacle;

a heater support for supporting said heating element a predetermined distance above the bottom of said oven, said heater support comprising a substantially horizontal top surface, substantially vertical sidewalls extending downwardly from two edges of said top surface, substantially horizontal ledge portions extending inwardly from the lower edge of said vertical sidewalls, substantially vertical spacer portions extending downwardly from the inner edge of said horizontal ledge portions and substantially horizontal flange portions extending outwardly from the lower edge of said vertical spacer portions, said top surface, vertical sidewalls and horizontal ledge portions cooperating to enclose and support said electrical heating element, said vertical spacer portions acting to separate said heating element a predetermined distance from the bottom of said oven and said horizontal flange portions forming means for attaching said heater support to said oven;

the heat generated by said heating element being confined within said heater support so that air beneath said top surface is maintained at a relatively higher temperature than the surrounding air within the cooking area to enhance the convection of the heated air from beneath said top surface to provide even heating throughout the cooking area;

said top surface and said vertical sidewalls having a plurality of apertures formed therein permitting circulation of air about the heating element, said apertures being positioned to prevent grease and moisture from dropping on said heating element;

a wood tray positiioned on said top surface and guided thereon by pin means on said top surface, said wood tray containing wood for smoking said food and comprising a wood container and a cover, the temperature of the heated air beneath said top surface being sufficient to cause heat conduction through said top surface and said wood tray to smoulder the wood therein;

said wood container comprising a horizontal bottom portion and vertical sidewalls for containing the wood and ash generated by the decomposition of the wood;

said cover having a plurality of holes formed therein and hingably mounted on said wood container so that the wood is entirely contained within said cover and container, said holes permitting smoke and heated air to escape from within said wood container while preventing flareup of the wood during the cooking operation and when said door assembly of said oven is opened; and said cover being hingably mounted to said container by pin means secured to said container passing through elongated slot means within said cover, said elongated slot means permitting adjustment of said cover to permit enclosure of wood extending beyond the upper edge of the sidewalls of said wood container.

* * * * *

UNITED STATES PATENT AND TRADEMARK OFFICE
CERTIFICATE OF CORRECTION

PATENT NO. : 4,355,570
DATED : October 26, 1982
INVENTOR(S) : EDWARD W. MARTIN, ET AL.

It is certified that error appears in the above—identified patent and that said Letters Patent is hereby corrected as shown below:

Column 8, line 19 "2" should be --22--;
Column 8, line 44 "moiture" should be --moisture--;
Column 9, line 31 "63" should be --62--;
Column 11, line 18 "oven door 4" should be --oven body 4--;
Column 14, line 11 "wood 232" should be --wood tray 232--;
Column 16, line 31 "positiioned" should be --positioned--.

Signed and Sealed this

Fifteenth Day of March 1983

[SEAL]

Attest:

GERALD J. MOSSINGHOFF

Attesting Officer    Commissioner of Patents and Trademarks